(12) United States Patent
Mukherjee et al.

(10) Patent No.: US 9,323,715 B2
(45) Date of Patent: Apr. 26, 2016

(54) METHOD AND APPARATUS TO REPRESENT A PROCESSOR CONTEXT WITH FEWER BITS

(71) Applicant: Cavium, Inc., San Jose, CA (US)

(72) Inventors: Shubhendu S. Mukherjee, Southborough, MA (US); Michael S. Bertone, Marlborough, MA (US); David A. Carlson, Haslet, TX (US)

(73) Assignee: Cavium, Inc., San Jose, CA (US)

(*) Notice: Subject to any disclaimer, the term of this patent is extended or adjusted under 35 U.S.C. 154(b) by 151 days.

(21) Appl. No.: 14/080,389

(22) Filed: Nov. 14, 2013

(65) Prior Publication Data

US 2015/0134931 A1 May 14, 2015

(51) Int. Cl.
G06F 9/46 (2006.01)
G06F 15/76 (2006.01)

(52) U.S. Cl.
CPC .......... *G06F 15/76* (2013.01); *G06F 9/461* (2013.01)

(58) Field of Classification Search
None
See application file for complete search history.

(56) References Cited

U.S. PATENT DOCUMENTS

| | | | |
|---|---|---|---|
| 5,696,927 A * | 12/1997 | MacDonald et al. | 711/207 |
| 6,151,570 A * | 11/2000 | Fuji | 704/3 |
| 6,813,522 B1 * | 11/2004 | Schwarm et al. | 700/5 |
| 7,552,254 B1 * | 6/2009 | George et al. | 710/58 |
| 8,832,381 B2 * | 9/2014 | Hunt | 711/133 |
| 2002/0038385 A1 * | 3/2002 | Kalliokulju | 709/247 |
| 2002/0144081 A1 * | 10/2002 | Willis et al. | 711/206 |
| 2005/0177837 A1 * | 8/2005 | Mensah et al. | 719/328 |
| 2005/0198639 A1 * | 9/2005 | Matsui | 718/100 |
| 2005/0228936 A1 * | 10/2005 | Kuo et al. | 711/1 |
| 2006/0106940 A1 * | 5/2006 | Jagannathan et al. | 709/238 |
| 2006/0136608 A1 | 6/2006 | Gilbert et al. | |
| 2007/0002850 A1 | 1/2007 | Guichard et al. | |
| 2007/0005906 A1 * | 1/2007 | Miyamoto | 711/143 |
| 2009/0021403 A1 * | 1/2009 | Chan et al. | 341/50 |
| 2009/0320031 A1 * | 12/2009 | Song | 718/102 |
| 2010/0023811 A1 * | 1/2010 | Moyer | 714/47 |
| 2010/0064117 A1 | 3/2010 | Henry et al. | |
| 2010/0188977 A1 * | 7/2010 | Rochon et al. | 370/235 |
| 2011/0016289 A1 * | 1/2011 | Ableidinger | 711/206 |
| 2011/0161620 A1 * | 6/2011 | Kaminski et al. | 711/207 |
| 2012/0215985 A1 * | 8/2012 | Hunt | 711/133 |
| 2012/0259822 A1 * | 10/2012 | Medgyesi et al. | 707/693 |
| 2013/0007191 A1 * | 1/2013 | Klappert et al. | 709/217 |
| 2013/0028095 A1 * | 1/2013 | Vasseur et al. | 370/241 |
| 2013/0138761 A1 * | 5/2013 | Vasudevan et al. | 709/213 |
| 2013/0160114 A1 * | 6/2013 | Greenwood et al. | 726/21 |
| 2013/0262816 A1 * | 10/2013 | Ronen et al. | 711/207 |
| 2013/0275728 A1 | 10/2013 | Toll et al. | |
| 2013/0326048 A1 * | 12/2013 | Heidasch | 709/224 |
| 2014/0032559 A1 * | 1/2014 | Wang et al. | 707/740 |
| 2014/0195287 A1 * | 7/2014 | Fraser | 705/7.15 |
| 2014/0223091 A1 * | 8/2014 | Hughes et al. | 711/105 |
| 2014/0266634 A1 * | 9/2014 | Castillo et al. | 340/12.3 |
| 2014/0341103 A1 * | 11/2014 | Hwang et al. | 370/312 |
| 2015/0156242 A1 * | 6/2015 | Hwang et al. | 370/312 |

* cited by examiner

*Primary Examiner* — Emerson Puente
*Assistant Examiner* — Mehran Kamran
(74) *Attorney, Agent, or Firm* — Hamilton, Brook, Smith & Reynolds, P.C.

(57) ABSTRACT

According to at least one example embodiment, a method and corresponding processor device comprise maintaining a translation data structure mapping uncompressed process context identifiers to corresponding compressed identifiers, the uncompressed process context identifiers and the corresponding compressed identifiers being associated with address spaces or corresponding computer processes. The compressed identifiers are employed to probe, or access, one or more structures of the processor device in executing an operation associated with a computer process.

24 Claims, 5 Drawing Sheets

METHOD AND APPARATUS TO REPRESENT A PROCESSOR CONTEXT WITH FEWER BITS

BACKGROUND

Despite the significant advances achieved in microprocessor architecture and design which have led to significant improvements in microprocessor speed and power consumption efficiency, ongoing research work in the field of microprocessor technology is looking into ways to further improve performance and speed of microprocessor chips.

SUMMARY

Many microprocessors support handling multiple processes and switching between them without invalidating or flushing corresponding software context data stored in processor memory. Typically, software context identifiers associated with corresponding computer processes are employed to refer to, and access, memory spaces associated with corresponding computer processes. According to at least one example embodiment, compressed software context identifiers, also referred to hereinafter as compressed process context identifiers, are employed in accessing the memory spaces associated with corresponding computer processes.

According to at least one example embodiment, a method and corresponding processor device comprise maintaining a translation data structure mapping uncompressed process context identifiers to corresponding compressed identifiers, the uncompressed process context identifiers and the corresponding compressed identifiers being associated with address spaces or corresponding computer processes. The compressed identifiers are employed to probe, or access, one or more structures of the processor device in executing an operation associated with a computer process.

The operation is associated with uncompressed software context identifier(s) and the translation data structure is probed each time the one or more structures of the processor device are to be accessed. Alternatively, the compressed software context identifier(s) associated with a computer process currently running in the processor device is/are stored in one or more registers. As such, the translation data structure is probed only if the compressed software context identifier(s) stored in the one or more registers is/are invalid.

When executing the operation, a memory component of the processor device, e.g., a memory register, is searched for the corresponding compressed software context identifier. Upon finding the compressed identifier, a determination is made on whether or not the compressed identifier is valid, and upon determining that the compressed identifier found is valid, the valid compressed identifier is used in accessing one or more structures of the processor device in executing the operation. However, if the compressed identifier found is determined to be invalid, the translation data structure is searched for other compressed identifier(s) mapped to the uncompressed process context identifier associated with the operation. If matching compressed identifier(s) is/are found in the translation data structure, the matching compressed identifier(s) is/are used in accessing one or more structures of the processor device. The matching identifier may also be stored in the memory component, e.g., memory register, of the processor device to facilitate future access. If no matching compressed identifier(s) is/are found in the translation data structure, new compressed identifier(s) is/are mapped to the uncompressed process context identifier(s) associated with the operation, and used to access one or more structures of the processor device in executing the operation.

The processor device may be a multi-core processor. The translation data structure may be shared between two or more core processors within the multi-core processor. Alternatively, each core processor within the multi-core processor maintains a translation data structure independent of any other core processor.

According to at least one example embodiment, the uncompressed process context identifier includes one or more uncompressed fields. At least one uncompressed field within the uncompressed process context identifier is translated into a corresponding compressed field within the corresponding compressed identifier. At least one uncompressed field within the uncompressed process context identifier is not translated into a compressed field within the corresponding compressed identifier based on an indication to omit the at least one uncompressed field.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Many microprocessors support handling multiple processes and switching between them without invalidating or flushing corresponding software context data stored in processor memory. Furthermore, many microprocessors implement virtualization extension allowing support of multiple software environments simultaneously. The support of multiple software environments and/or multiple processes by a physical processor enables the processor to handle complex software applications.

Microprocessors typically make use of specific identifiers to distinguish between different computer processes as well as distinct software environments. For example, many operating systems use an address space identifier (ASID) to identify memory space associated with a running program. A virtual machine identifier (VMID) may also be employed to identify a virtual machine. Such identifiers, or equivalents, as well as other potential identifiers or parameters are typically used to identify a software context.

Figure 1A:
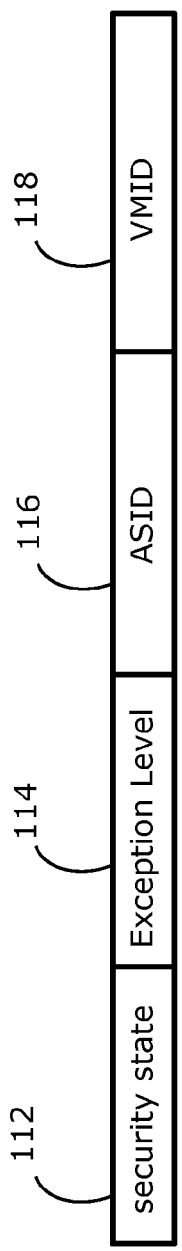
FIG. 1A is a block diagram illustrating a software context identifier, according to at least one example embodiment.

FIG. 1A is a block diagram illustrating a set of software context identifiers, according to at least one example embodiment. The set of software context identifiers includes an address space identifier (ASID) 116 and a virtual machine identifier (VMID) 118. The set of software context identifiers may further include a security state 112. The security state 112 indicates, for example, a non-secure or secure (NS/S) state of the corresponding software context. The set of software context identifiers may also include an exception level (EL) 114. The EL 114 may also be referred to as a privilege level, priority level, or the like, indication the priority of the corresponding software process. In ARM architectures, for example, the security state 112 may be a one-bit parameter, the exception level (EL) 114 may be a two-bit parameter, the ASID 116 may be a 16-bit identifier, and the VMID may be a 16-bit identifier. A person skilled in the art should appreciate that the set of software context identifiers may be designed differently. For example, the set of software context identifiers may include a different combination of identifiers or parameters compared to the one shown in FIG. 1A. Also, the identifiers/parameters may have different names different sizes, or be in different order than the ones described in FIG. 1A.

Figure 1B:
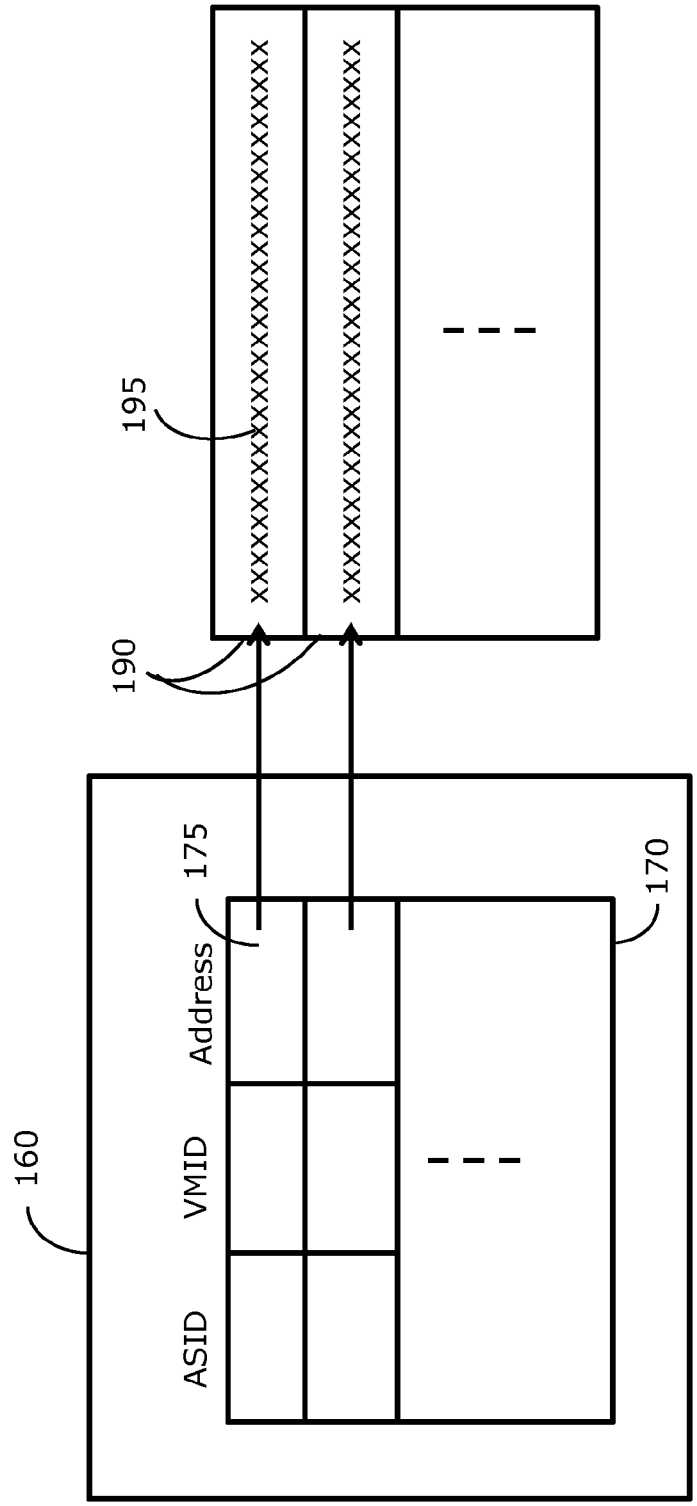
FIG. 1B is a diagram illustrating linking software context identifiers identifying a running program to corresponding memory space, or data stored therein, according to at least one example embodiment.

FIG. 1B is a diagram illustrating linking software context identifiers identifying a running program to corresponding memory space, or data stored therein, according to at least one example embodiment. Modern microprocessors typically use software context identifiers, e.g., ASID and VMID, in a hardware structure 160 to identify a memory space 190, or data 195 stored therein, associated with a specific program. The hardware structure 160 may be a data cache (D-Cache), instructions cache (I-Cache), translation look-aside buffer (TLB), micro TLB (μTLB), page table walker cache, the like, or a combination thereof. According to at least one example embodiment, the hardware structure 160 stores one or more software context identifiers, e.g., ASID 116 and VMID 118, for each running program. The software context identifiers corresponding to the running program are linked to a memory address 175 indicative of a memory location space 190 storing data 195 associated with the running program. The software context identifiers corresponding to a given running program and the corresponding memory address 175 may be stored in the hardware structure 160 according to a data structure 170, e.g., a table, a linked list, a tree, or the like. For example, the data structure may be a table where each row, or each column, of the table stores the software context identifiers and the memory address 175 associated with the same running program. Alternatively, the software context identifiers associated with a given running program may be linked to the corresponding memory address 175 through a linked list or any other suitable data structure known to a person with ordinary skill in the art.

The use of software context identifiers allows multiple software contexts to reside in the same microprocessor, or core processor, concurrently. In the absence of such software context identifiers in the hardware structure 160, the hardware structure 160 would have to be flushed entirely when a software context change happens. In other words, if the hardware structure 160 stores memory addresses 175 associated with only a current running program, such memory addresses 175 are deleted and new memory addresses are stored when the software context changes. Flushing the hardware structure 160 with each change of the software context degrades performance. For example, when control is returned to a prior software context, flushing the hardware structure 160 may be avoided if corresponding software context identifiers are stored in the hardware structure 160 to reference corresponding memory location space 190.

A content-addressable memory (CAM) structure usually has tags, such as cache tags, which are used to probe hardware a structure of the microprocessor. In a CAM structure, a software context identifier may be incorporated in the tags. As such, a match between tags is indicative of successful probing of the hardware structure. In a random-access memory (RAM), lookup operations are typically performed based on memory addresses. As such, in a RAM, tags may be used to statically assign specific regions of the random-access memory that are allocated to a specific software context. In other words, memory addresses may grouped into regions and each region may be assigned to a specific software context.

While maintaining multiple software contexts concurrently in a microprocessor, or a core processor, enhances processor performance, storing the corresponding software context identifiers represents a burden in terms of memory usage within the microprocessor, or the core processor. For example, considering the software context identifiers described in FIG. 1A, the ASID 116 and the VMID 118 are typically represented using 16 bits each, the EL 114 is represented using two bits, and the security state is defined using one bit. As such, 35 bits are used for storing the software context identifiers associated with a single running program in a single hardware structure 160. With 35 bits, a total of $2^{35}$, or 32 billion, different software contexts may be defined. However, a modern microprocessor typically runs significantly fewer software contexts simultaneously. Furthermore, for a given software context, the corresponding software context identifiers may be stored in multiple hardware structures 160, e.g., D-Cache, I-Cache, page table walker cache, TLB, and μTLB, of the microprocessor. In fact, storage of the software context identifiers incurs a significant hardware cost, which may represent a significant portion in processor core area.

According to at least one example embodiment, software context identifiers are translated into compressed identifiers represented with fewer bits resulting in more efficient use of processor space area. A translation table (TT) is employed to map uncompressed software context identifiers, e.g., ASID 116, VMID 118, etc., associated with a given running program, into corresponding compressed software context identifier(s). The microprocessor employs the compressed software context identifier(s) to represent the corresponding software context in the hardware structure 160. For example, given a combination of the security state 112, EL 114, ASID 116, and VMID 118, a corresponding compressed software context identifier may be stored in the translation table. If no corresponding compressed software context identifier exists within the translation table, the processor allocates a new compressed software context identifier and maps it to the given combination of software context identifiers within the translation table.

Figure 2A:
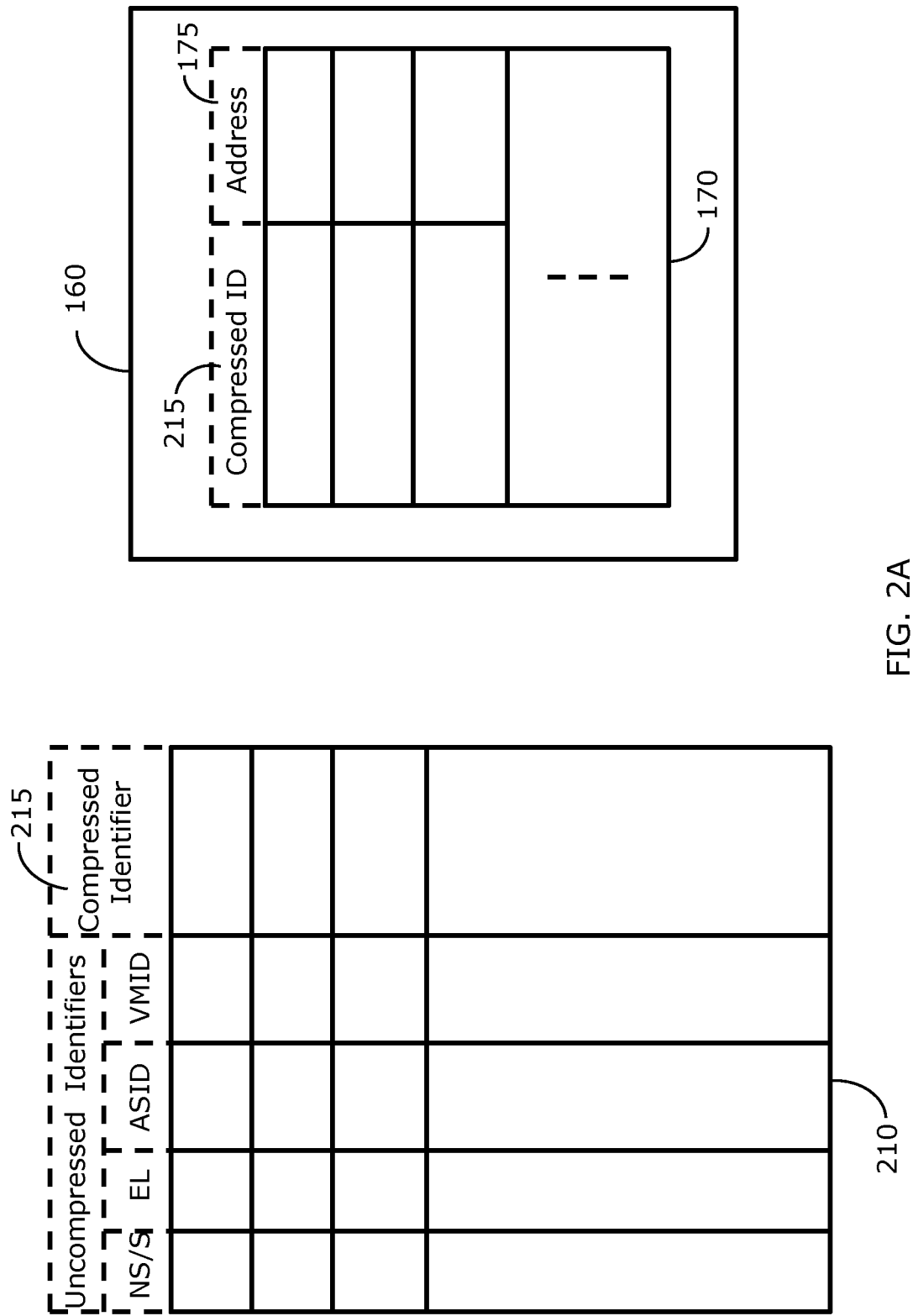
FIGS. 2A-2C are diagrams illustrating example implementations of the translation table and the use of the compressed software context identifiers within a hardware structure.
Figure 2B:
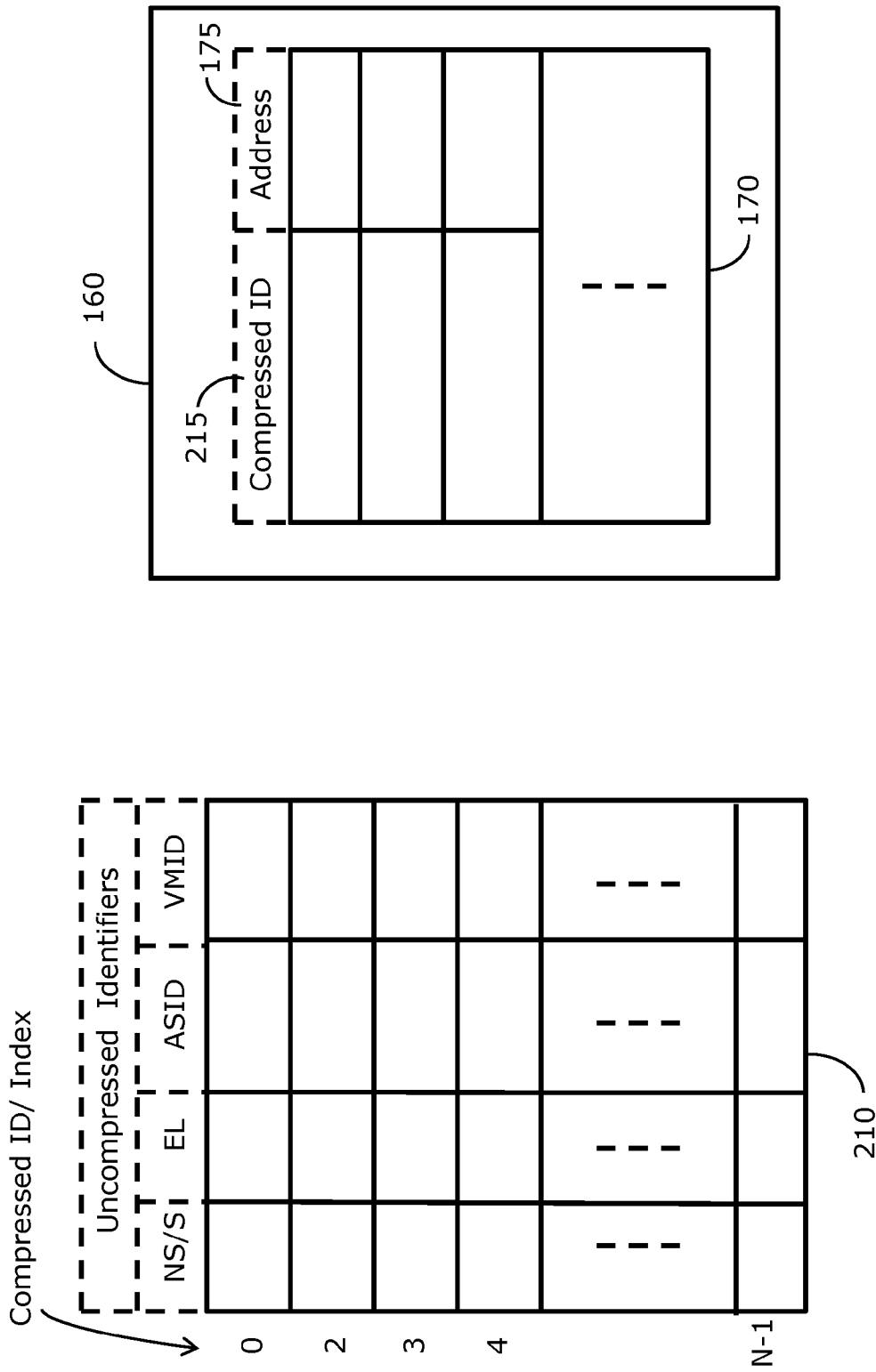
Figure 2C:
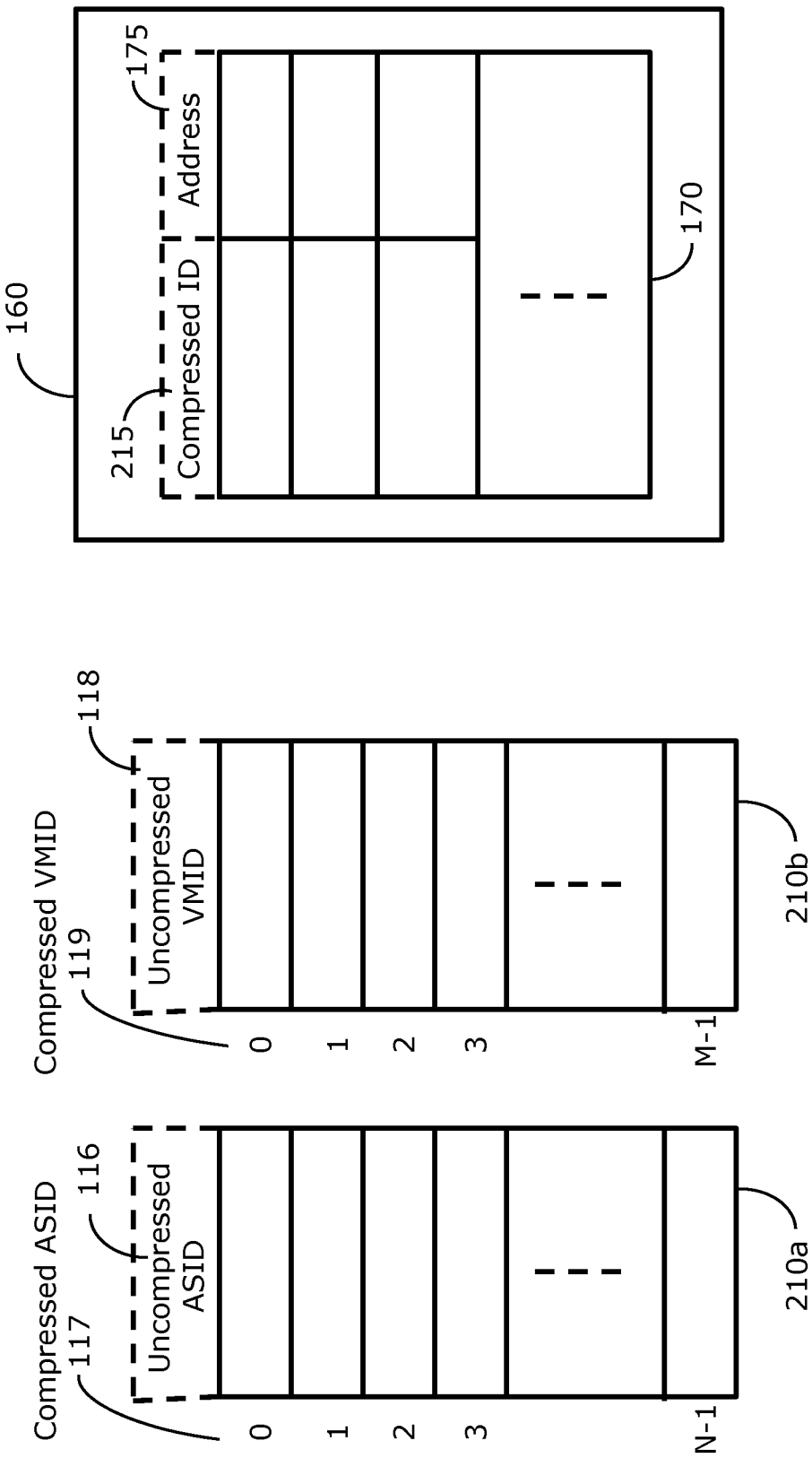

FIGS. 2A-2C are diagrams illustrating example implementations of the translation table 210 and the use of the compressed software context identifiers within the hardware structure 160. According to the example implementation shown in FIG. 2A, each row of the translation table 210 maps one or more uncompressed software context identifiers, e.g., the security state 112, EL 114, ASID 116, and the VMID 118, associated with a given running program, to the corresponding compressed software context identifier 215. Within the hardware structure 160, each compressed software context identifier 215 is linked to a memory address 175 indicative of a memory space associated with the running program referred to by the same compressed software context identifier 215. That is, instead of using the uncompressed software context identifiers, the corresponding compressed software context identifier 215 is employed within the hardware structure 160 to refer to the software context of the given running program.

In the example implementation shown in FIG. 2B, the compressed software context identifiers 215 are not stored within the translation table 210, but are rather represented by the indices of the corresponding uncompressed software context identifiers within the translation table 210. In other words, a compressed software context identifier is defined based on where the corresponding uncompressed software context identifier(s) is/are stored within the translation table 210. In the hardware structure 160, the memory address 175 indicative of the memory space associated with the given running program is linked with the corresponding compressed software context identifier 215.

In FIG. 2C, two translation tables 210a and 210b, or data structures, are employed. According to an example implementation, one or more uncompressed software context identifiers are compressed separately. For example, the ASID 116 for each software context is compressed into a corresponding compressed ASID 117, e.g., ASID_MAP, and the VMID 118 is compressed into a corresponding compressed VMID 119, e.g., VMID_MAP.

The translation table 210a includes values of the ASID 116 associated with corresponding software contexts. For each ASID 116, the corresponding compressed parameter ASID_MAP 117 is defined as the index of the corresponding ASID 116 within the translation table 210a. The translation table 210b includes values of the VMID 118 associated with corresponding software contexts. For each VMID 118, the corresponding compressed parameter VMID_MAP 119 is defined as the index of the corresponding VMID 118 within the translation table 210b. The compressed software context identifier 215 is then defined in terms of the corresponding compressed parameters ASID_MAP 117 and VMID_MAP 119, e.g., as a concatenation of both. In the hardware structure 160, the memory address 175 indicative of the memory space associated with the given running program is linked with the corresponding compressed software context identifier 215.

According to an example implementation, the table 210a has 64 entries with compressed ASID identifiers 117 running from 0 to 63. Also the table 210b has 16 entries with compressed VMID identifiers 119 running from 0 to 15. For example, assume that at a given point of time only the first four rows, e.g., indexed 0 to 3, of the table 210a have valid ASID identifiers 116 and that only three rows, e.g., indexed 0 to 2, of the table 210b include valid VMID identifiers 118. When assigning new compressed identifiers for a given software context, the corresponding uncompressed ASID 116 is added in the next available row, e.g., fifth row, of the table 210a and the corresponding compressed ASID identifier 117 is 000100. Also, the corresponding uncompressed VMID 116 is added in the next available row, e.g., fourth row, of the table 210b and the corresponding compressed VMID identifier 119 is 0011. The compressed ASID 117 and compressed VMID 119 may be defined by simply incrementing counters indicative of indices of the last rows with valid uncompressed identifiers of the tables 210a and 210b. By concatenating the compressed ASID 117 and the compressed VMID 119, the corresponding compressed identifier 215 is defined as 0001000011.

A person skilled in the art should appreciate that the mapping between the uncompressed software context identifiers, e.g., 116 and 118, and the corresponding compressed software context identifiers, e.g., 117, 119, and/or 215, may be achieved through other data structures other than the translation tables 210, 210a, or 210b. For example, the uncompressed software context identifiers, e.g., 116 and 118, may be mapped to the corresponding compressed software context identifier s, e.g., 117, 119, and/or 215, through one or more pointers. In general terms, the microprocessor, or core processor, maintains a mapping between uncompressed software context identifiers, e.g., 116 and 118, and corresponding compressed software context identifier(s), e.g., 117, 119, and/or 215. Maintaining the mapping includes generating, updating, and storing the mapping. The compressed software context identifier(s), associated with a given software context, is/are employed in probing one or more hardware structures 160 of the microprocessor, or core processor, when executing an operation associated with the corresponding identified software context.

Accessing an address space associated with a software context may be initiated with a fetch, load, store, or other operation executed within the same software context. When accessing the address space based on compressed software context identifiers 215, one option is to lookup, or translate, uncompressed software context identifiers, associated with the software context, into corresponding compressed software context identifier based on, for example, the translation table on every such address space access. Such a translation usually involves a CAM lookup, and as such, frequent CAM lookups result in inefficient power consumption. An alternative way is to keep a representation of the compressed software context identifier(s) for the current software context in a specific register. In other words, for current running program, the corresponding compressed software context identifier(s) is/are stored in the specific register. The corresponding uncompressed software context identifiers, e.g., ASID 116 and/or VMID 118, are also stored in other specific register(s). Thus, any access to the address space makes use of the current compressed identifier stored in the specific register, and/or the corresponding uncompressed identifiers stored in the other specific registers, to probe any relevant hardware structure using this identifier. The specific register may also include one or more bits indicative of whether or not the stored compressed context identifier is valid.

As the software context changes, the content of the specific registers is modified to store compressed and uncompressed context software identifiers associated with the new program running in the microprocessor, or core processor. In other words, whenever the software context is changed or invalidated, the uncompressed software context identifier of the new software context is generated and/or stored in the specific register. The generation and/or storing of the uncompressed software context identifier is performed each time a new software context is created, e.g., a new program is running in the microprocessor, or the core processor. According to an example embodiment, the new uncompressed software context identifier is generated and/or stored in the specific register when a first fetch, store, or other instruction associated with the new software context is initiated.

According to at least one example embodiment, to reduce frequent loading, or generating, of new compressed and uncompressed software context identifiers in the specific register(s), the operating system takes into account the way the ASID 116 is assigned to different software processes. For example, the ASID 116 may be assigned in a way to be the same for user space and operating system space. As such, the ASID may not change in response to a system call. Hence, the corresponding compressed software context identifier 215, stored in the specific register(s) is invalidated in response to the system call.

According to at least one example embodiment, the way the compressed identifier(s) is/are generated depends on how the same compressed identifier(s) is/are defined. For example, considering two translation tables, e.g., 210a indicative of compressed ASID 117 and 210b indicative of compressed VMID 119, as shown in FIG. 2C, an operating system may designate the same address to be shared among multiple processes. In such case, the shared address is associated with an indicator, e.g., a global bit. If the indicator is set, the ASID is ignored in probing a processor core structure with the context identifier. Also, the use of different translation tables for different uncompressed software context identifiers, as shown in FIG. 2C, allows identifying the portion of the uncompressed identifier 215 corresponding to the ASID 116.

According to at least one example embodiment, when the operating system makes a hypercall or a control transfer to the hypervisor or secure state, the software context running in the microprocessor changes because the VMID changes. However, if the hypervisor or secure state are implemented as a single software context, the software context running in the microprocessor may be determined based on the privilege or exception level 114. As such, the compressed software context identifier(s) stored in the specific register(s) is/are not invalidated upon the operating system switching to a hypervisor or a secure state. Instead, a predefined and fixed compressed software context identifier associated with the hypervisor and the secure state is employed without invalidating the compressed software context identifier(s) previously stored in the specific register(s). When the operating system switches back to the operating system, the compressed software context identifier(s) still being stored in the specific register(s) is then employed to access the memory space.

According to at least one example embodiment, when a translation table is full and no more space is available therein for new software context identifiers, entries of the translation table(s), the specific register(s), and any associated hardware structures are invalidated. Invalidation of such entries may also be initiated externally, e.g., by software running the microprocessor, or core processor.

Figure 3:
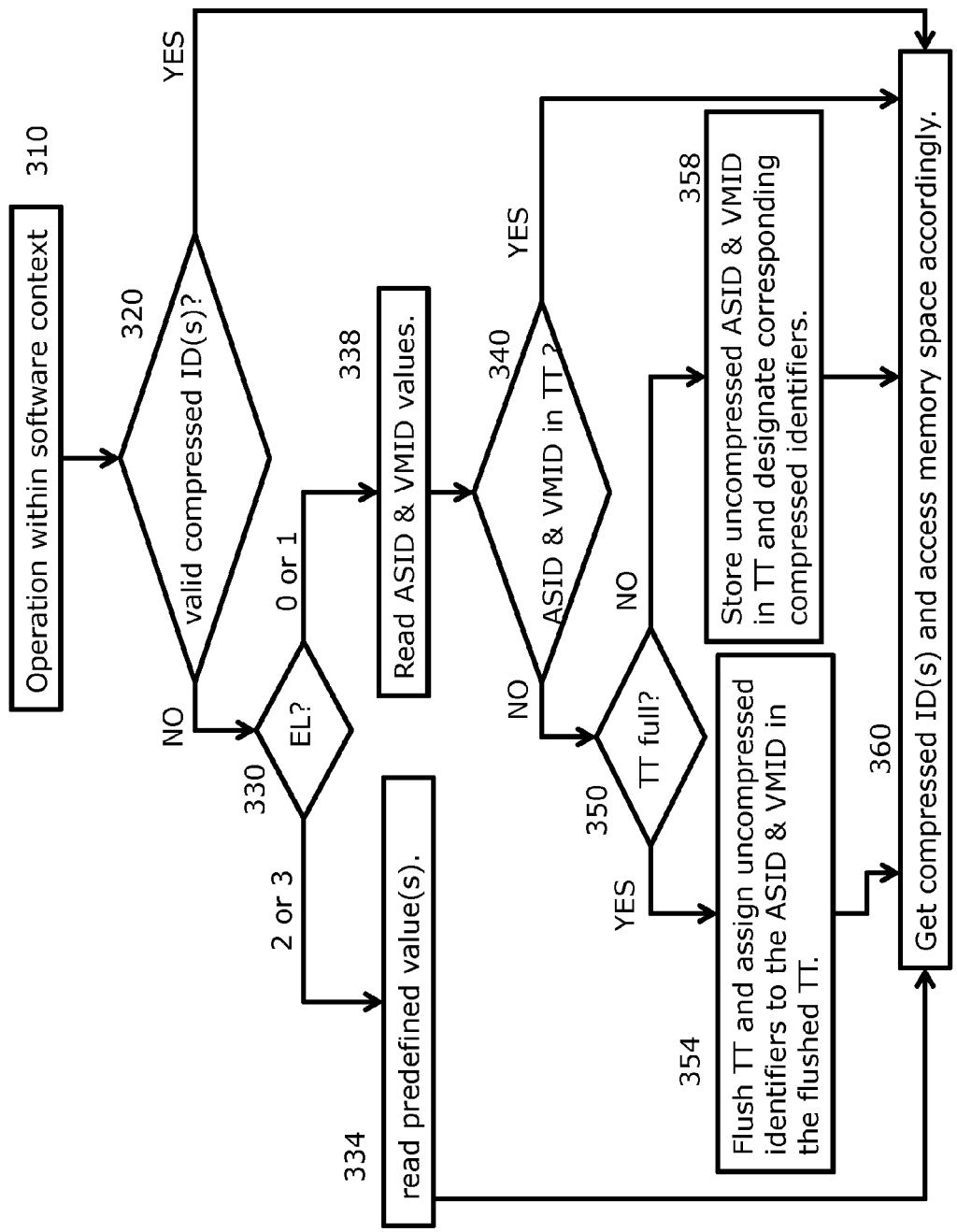
FIG. 3 is a flow chart illustrating a method of employing compressed software context identifiers.

FIG. 3 is a flow chart illustrating a method of allocating and employing compressed software context identifiers, according to at least one example embodiment. At block 310, an instruction associated with a process is loaded. The process, and the corresponding loaded instruction, is associated with corresponding uncompressed software context identifiers, e.g., a security state 112, exception level 114, ASID 116, VMID 118, or a combination thereof. At block 320, the validity of the current compressed software context identifier 215 stored in the specific register is checked. For example, in checking the validity of the current compressed software context identifier 215 stored in the specific register, a corresponding indicator indicative is checked. Alternatively, the validity of the current compressed context identifier is determined based on the value of the current compressed software context identifier or the values of the corresponding compressed ASID 117 and corresponding compressed VMID 119, e.g., when the corresponding compressed ASID 117 and corresponding compressed VMID 119 are both equal to zero, the current compressed software context identifier is determined to be invalid.

If the current compressed software context identifier is determined to be valid at block 320, memory space is accessed as part of executing the operation, at block 360, based on the current compressed software context determined to be valid. According to an example implementation, predefined compressed software context identifier(s) is/are defined for the case where the process is indicative of a virtual machine or secure state, e.g., EL=2 or 3. Such predefined compressed software context identifiers are stored separately from the translation table(s). As such, if the current compressed software context identifier is determined to be invalid at block 320, the exception level 114 corresponding to the process is checked at block 330. If the exception level 114 is determined to be indicative of a hypervisor or a process running a secure monitor, corresponding predefined compressed software context identifier is determined, at block 334, as the compressed software context identifier 215 to be used to access the memory space. The memory space is then accessed, at block 360, using the predefined compressed software context identifier(s). If the exception level 114 is determined to be indicative of a user or operating system process, e.g., EL=0 or 1, the uncompressed software context identifiers corresponding to the loaded instruction are read at block 338 and used to probe the translation table(s), at block 340, for the corresponding compressed software context identifier 215.

When probing the translation table(s) at block 340, the translation table(s) is/are checked for the software context identifiers corresponding to the loaded instruction. If the software context identifiers corresponding to the loaded instruction are found in the translation table(s), at block 340, the corresponding compressed software context identifier 215 is determined from the translation table(s), and at 360 the compressed software context identifier 215 is retrieved and used to access the memory space. Getting, or retrieving, the compressed software context identifier 215 at block may include concatenating multiple compressed identifiers, e.g., 117 and 119, into the compressed software context identifier 215 if multiple translation tables are employed, e.g., as shown in FIG. 2C.

However, if the uncompressed software context identifiers corresponding to the loaded instruction are not found in the translation table(s), at block 340, the uncompressed software context identifier(s) and the corresponding compressed software context identifier(s), e.g., 215 or 117 and 119, is/are allocated in the translation table(s). At block 350, the translation table(s), e.g., 210, 210a, 210b, is/are checked for available space to allocate the uncompressed software context identifiers corresponding to the loaded instruction. If the translation table(s) is/are found to be full at block 350, the translation table(s) is/are flushed, e.g., the corresponding content is deleted, and the uncompressed software context identifiers corresponding to the loaded instruction are loaded in the flushed translation table and corresponding compressed identifier(s) is/are assigned to the loaded uncompressed software context identifier(s), at block 354. Once the corresponding compressed software context identifier(s), e.g., 215, 117, or 119, is/are assigned, the compressed software context identifier 215 is used to access the memory space at block 360. If the translation table(s) is/are found not to be full, the uncompressed software context identifiers corresponding to the loaded instruction are loaded in the translation table(s) and corresponding compressed identifier(s) is/are assigned to the loaded uncompressed software context identifier(s), at block 358. Then, at block 360, the compressed software context identifier 215 is used to access the memory space associated with the process or the loaded instruction thereof.

Software context identifiers in the translation table may be invalidated in a number of different ways. When the translation table is full, either because all entries have been allocated or because one of the many tables corresponding to a field is full, the translation table is flushed, which automatically invalidates all entries in the translation table(s). Alternatively, specific processor core operations may cause the software context identifiers to be invalidated. For example, in ARM processor chips, a processor core may issue a TLB shootdown instruction for a specific VMID. Consequently, all address translations corresponding to the specific VMID are removed from the core processor. As such, all compressed identifiers that correspond to the specific VMID being invalidated are invalidated. An invalidated compressed identifier is not reused until and unless the entire translation table is flushed. As such, any correctness problem with invalidated compressed identifiers in the translation table is avoided. Also, when invalidating a compressed identifier in the translation table, the same compressed identifier is also invalidated in the memory register if the invalidated compressed identifier is stored in the memory register. Accordingly, an invalidated compressed software context identifier is not used to probe a hardware structure, e.g., memory, of the microprocessor.

A person skilled in the art should appreciate that embodiments of the method described with respect to FIG. 3 may be implemented in different ways depending on the defined uncompressed software context identifiers and the way the translation from uncompressed to compressed identifiers is implemented.

While this invention has been particularly shown and described with references to example embodiments thereof, it will be understood by those skilled in the art that various changes in form and details may be made therein without departing from the scope of the invention encompassed by the appended claims.

What is claimed is:

1. A method of handling processes within a processor device, the method comprising:
    maintaining a translation table mapping uncompressed process context identifiers to corresponding compressed identifiers, the uncompressed process context identifiers and the corresponding compressed identifiers being associated with address spaces or corresponding computer processes; and
    employing the compressed identifiers to probe one or more structures of the processor device in executing an operation;
    wherein executing the operation comprises:
    determining whether or not a current compressed identifier is valid;
    upon determining that the current compressed identifier is valid, using the valid compressed identifier to probe one or more structures of the processor device in executing the operation;
    upon determining that the current compressed identifier is invalid, searching the translation table, based on an uncompressed process context identifier associated with the operation, for one other compressed identifier mapped to the uncompressed process context identifier.

2. The method according to claim 1, wherein the one or more structures of the processor device include at least one of a data cache, an instruction cache, a page table walker cache, a translation look-aside buffer (TLB), and a micro translation look-aside buffer (µTLB).

3. The method according to claim 1 further comprising storing a compressed identifier associated with a computer process running in the processor device within a register.

4. The method according to claim 1 further comprising:
    if said one other compressed identifier is found in the translation table, using said one other compressed identifier to probe one or more structures of the core processor in executing the operation; and
    if said one other compressed identifier is not found in the translation table, generating, in the translation table, a new compressed identifier mapped to the uncompressed process context identifier, and using the new compressed identifier generated to probe one or more structures of the processor device in executing the operation.

5. The method according to claim 1 further comprising generating the translation table.

6. The method according to claim 1, wherein the processor device is a multi-core processor and the translation table is shared between two or more core processors within the multi-core processor.

7. The method according to claim 1, wherein the processor device is a multi-core processor and each core processor within the multi-core processor maintains a translation table independent of any other core processor.

8. The method according to claim 1, wherein each uncompressed process context identifier includes one or more uncompressed fields.

9. The method according to claim 8, wherein at least one uncompressed field within each uncompressed process context identifier is translated into a compressed field within the corresponding compressed identifier.

10. The method according to claim 8, wherein at least one uncompressed field within each uncompressed process context identifier is not translated into a compressed field within the corresponding compressed identifier based on an indication to omit the at least one uncompressed field.

11. The method according to claim 8, wherein each uncompressed process context identifier includes multiple uncompressed fields and wherein generating each uncompressed process context identifier includes:
    translating two or more uncompressed fields of the uncompressed process context identifier into corresponding two or more compressed fields; and
    concatenating the two or more compressed fields to generate the compressed process identifier.

12. The method according to claim 1, wherein a compressed identifier is associated with a category of computer processes.

13. A processor chip comprising:
    one or more core processors, at least one of the one or more core processors configured to:
        maintain a translation table mapping uncompressed process context identifiers to corresponding compressed identifiers, the uncompressed process context identifiers and the corresponding compressed identifiers being associated with address spaces or corresponding computer processes; and
        employing the compressed identifiers to probe one or more structures of the at least one of the one or more core processors in executing an operation within the processor chip;
    wherein in executing the operation, the at least one of the one or more core processors is further configured to:
        determine whether or not a current compressed identifier is valid;
        upon determining that the compressed identifier found is valid, use the valid compressed identifier to probe one or more structures of the at least one of the one or more core processors in executing the operation;
        upon determining that the current compressed identifier found is invalid, search the translation table, based on an uncompressed process context identifier corresponding to the operation, for one other compressed identifier mapped to the uncompressed process context identifier.

14. The processor chip according to claim 13, wherein the one or more structures of the processor device include at least one of a data cache, an instruction cache, a page table walker cache, a translation look-aside buffer (TLB), and a micro translation look-aside buffer (µTLB).

15. The processor chip according to claim 13, wherein the at least one of the one or more core processors includes a register configured to store a compressed identifier associated with a computer process running in the core processor.

16. The processor chip according to claim 13, wherein the at least one of the one or more core processors is further configured to:
    if said one other compressed identifier is found in the translation table, use said one other compressed identifier to probe one or more structures of the at least one of the one or more core processors in executing the operation; and
    if said one other compressed identifier is not found in the translation table, generate, in the translation table, a new compressed identifier mapped to the uncompressed process context identifier, and using the new compressed identifier generated to probe one or more structures of the at least one of the one or more core processors in executing the operation.

17. The processor chip according to claim 13, wherein the at least one of the one or more core processors is further configured to generate the translation table.

18. The processor chip according to claim 13, wherein the processor chip is a multi-core processor and two or more core processors are configured to share the same translation table.

19. The processor chip according to claim 13, wherein the processor chip is a multi-core processor and each core processor is configured to maintain a translation table independent of any other core processor.

20. The processor chip according to claim 13, wherein each uncompressed process context identifier includes one or more uncompressed fields.

21. The processor chip according to claim 20, wherein the at least one of the one or more core processors is configured to translate at least one uncompressed field within each uncompressed process context identifier into a compressed field within the corresponding compressed identifier.

22. The processor chip according to claim 20, wherein the at least one of the one or more core processors is configured not to translate at least one uncompressed field within each uncompressed process context identifier into a compressed field within the corresponding compressed identifier based on an indication to omit the at least one uncompressed field.

23. The processor chip according to claim 20, wherein each uncompressed process context identifier includes multiple uncompressed fields and wherein the at least one of the one or more core processors is configured to:
    translate two or more uncompressed fields of the uncompressed process context identifier into corresponding two or more compressed fields; and
    concatenate the two or more compressed fields to generate the compressed process identifier.

24. The processor chip according to claim 13, wherein a compressed identifier is associated with a category of computer processes.

* * * * *